A. T. LEWIS.
MOTOR CONTROL SYSTEM.
APPLICATION FILED SEPT. 1, 1915.

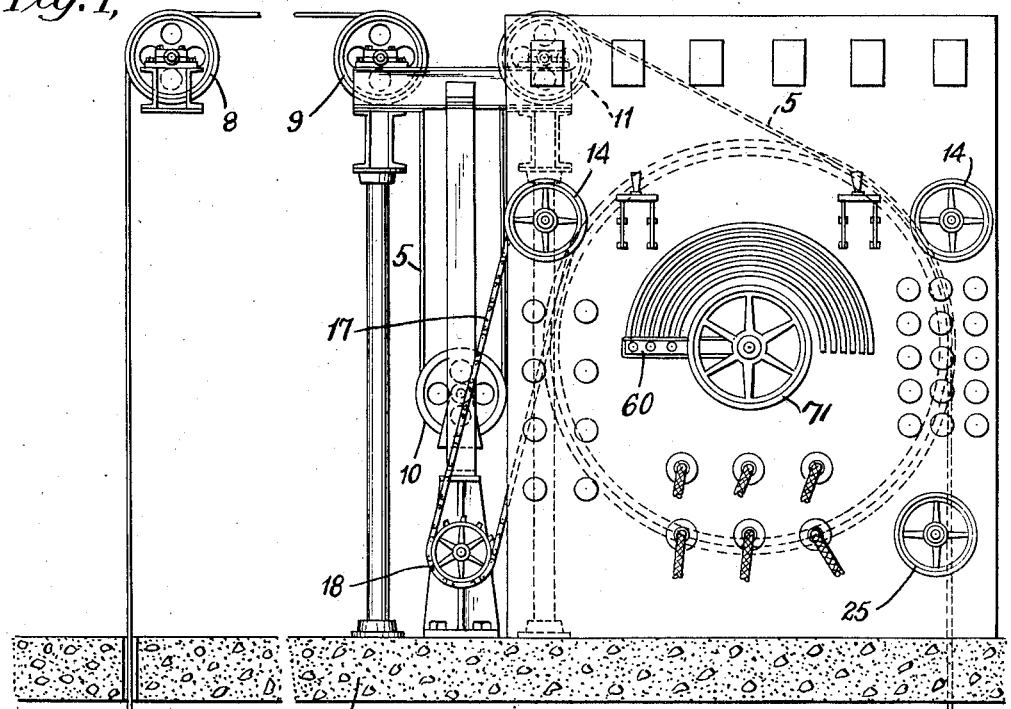
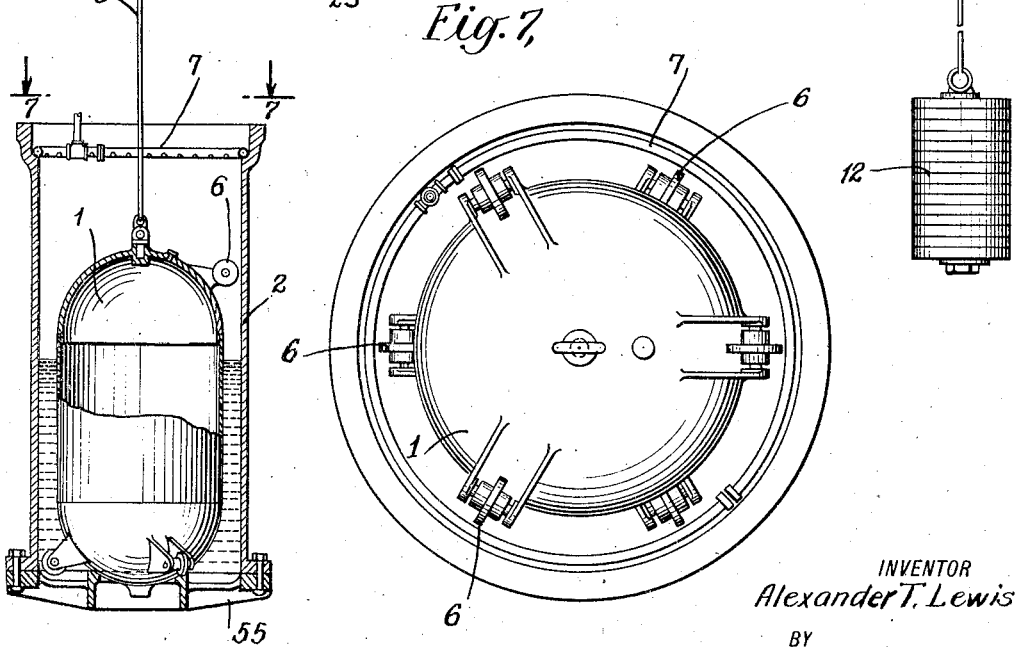

1,357,102.

Patented Oct. 26, 1920.
5 SHEETS—SHEET 2.

INVENTOR
Alexander T. Lewis
BY
his ATTORNEYS

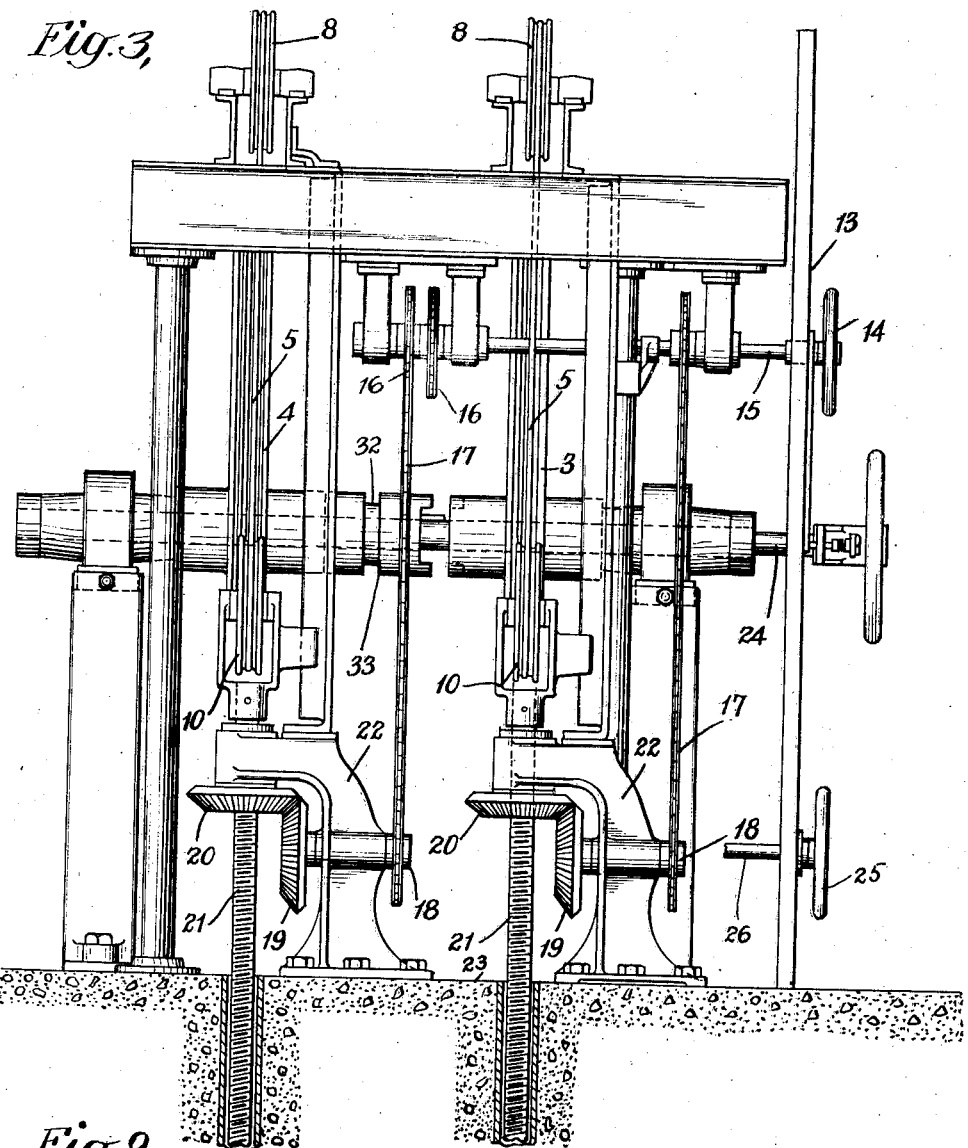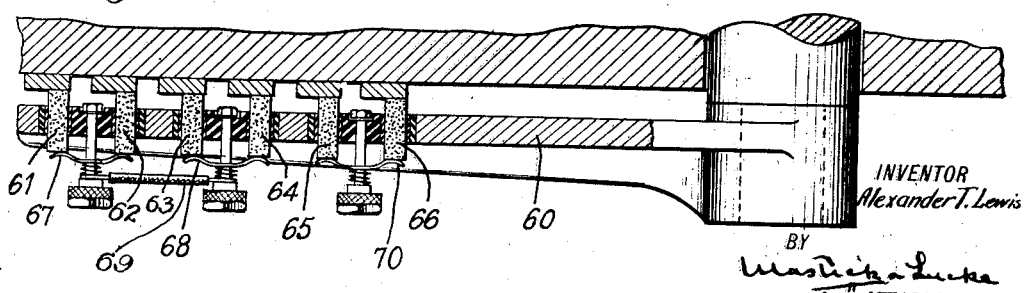

A. T. LEWIS.
MOTOR CONTROL SYSTEM.
APPLICATION FILED SEPT. 1, 1915.

1,357,102.

Patented Oct. 26, 1920.
5 SHEETS—SHEET 4.

INVENTOR
Alexander T. Lewis
BY
his ATTORNEYS

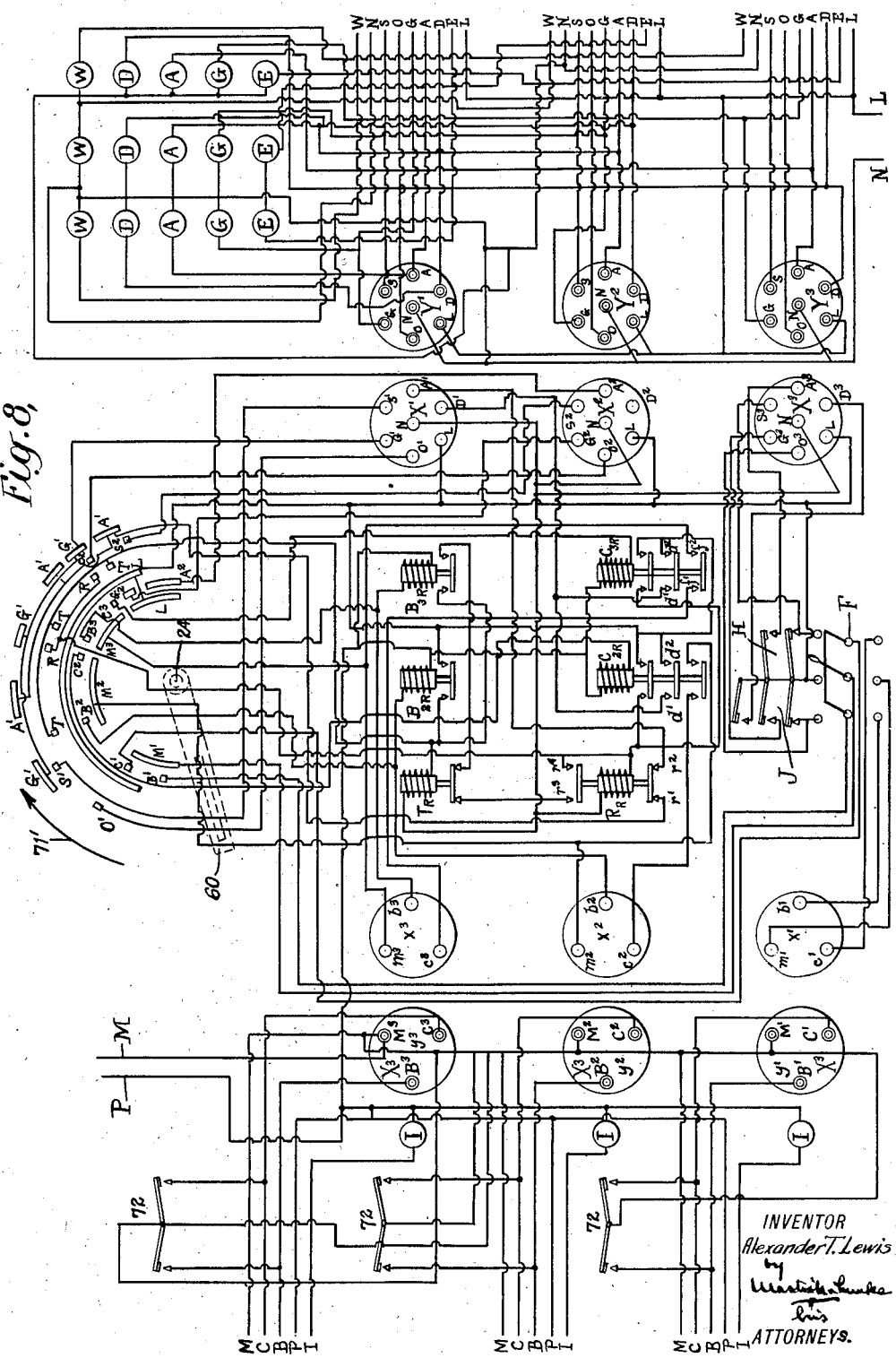

UNITED STATES PATENT OFFICE.

ALEXANDER T. LEWIS, OF BROOKLINE, PENNSYLVANIA.

MOTOR-CONTROL SYSTEM.

1,357,102.    Specification of Letters Patent.    Patented Oct. 26, 1920.

Application filed September 1, 1915. Serial No. 48,435.

*To all whom it may concern:*

Be it known that I, ALEXANDER T. LEWIS, a citizen of the United States of America, residing at Brookline, Delaware county, Pennsylvania, have invented certain new and useful Improvements in Motor-Control Systems, of which the following is a specification.

The invention relates to motor control systems.

More particularly, the invention relates to motor control systems adapted for pumping liquid and other fluid matter, or performing any other motor service wherein the control is effected at will either automatically under predetermined conditions or manually. In the preferred forms of the invention, the master controller automatically, as well as manually, controls the starting and stopping of any one or more constant speed motors. In such cases wherein variable speed motors are employed the master controller also controls the starting, speeding up, slowing down and stopping of any one or more variable speed motors. The controller acts over a range from any desired minimum to any desired maximum. The requirements of the service under any particular circumstances determine whether constant speed motors only, or variable speed motors only, or a combination of both constant motors and variable speed motors are used. Provision is also made for substituting any desired variable speed motor for any particular constant speed motor. In general, the master controller effects the rate of service conforming to the required duty.

The term constant speed motors as used herein is intended to describe a motor which may be started automatically by a suitable controller and after being started will continue to operate at substantially constant speed irrespective of changes in load and is typified by squirrel cage induction motors and shunt wound direct current motors. Such a motor is usually the cheapest, simplest and most reliable and one of the chief uses of my invention is to provide for more general use of such motors in installations where the duty cycle is very irregular and constant speed motors have not been practicable except in combination with expensive human supervision.

The term variable speed motor as used herein is intended to describe a motor which may be started automatically by a suitable controller and after being started may change its speed responsive to changes in load, or controller position. The preferred form of variable speed motor for such duty as sewage pumping hereinafter described is a commutating, brush shifting type of alternating current motor or a shunt field control adjustable speed direct current motor but for some applications a slip-ring or multi-speed alternating current motor or series or compound wound direct current motor would be suitable. By combining the control of both constant and variable speed motors in one controller, I am able to greatly reduce the expense and risk of human supervision and increase the over-all efficiency of plants having irregular duty cycles. I have also provided means for making the operation of such a controller more dependable and safeguarded it with protective devices so as to reduce the time and intelligence required of operators to much less than has heretofore been necessary.

By the use of the term "motors," it will be understood that said term includes also motors other than electric motors, such as steam turbines and other prime movers, and that the invention is also applicable to the control of steam turbines or other movers when used in service requiring regulation of torque or speed, or both.

The invention is applicable for all uses of constant speed motors or variable speed motors performing any desired motor duty, and the general object of the invention may be typified by specific reference to a motor controller system controlling both constant speed and variable speed motors operating pumps for pumping sewage. In such sewage plant, the rate of inflow of sewage into a suction well, is the basis of service of the motors, and the general plan of operation of the controller is to automatically pump out the sewage as fast as the regular flow of sewage into the suction well. In such motor driven pumping stations, the pump capacity and speed of pumps in service required therefor, are maintained at all times to prevent overhauling of the inflow by the pumps to such extent as to empty the suction well, and also to prevent overhauling of the pumps by the inflow to such extent so as to allow the level of the sewage in the suction well to exceed a predetermined level.

In such sewage pumping stations, the rate of discharge of the sewage into the settling tanks is maintained substantially constant, consistent with the rate of inflow of the sewage into the suction well, thereby securing a markedly improved efficiency in the digesting treatment; and materially aiding in the prevention of disturbances in said settling tanks which have resulted in vile odors being emitted from sewage plants as constructed prior to my invention, where the pumping has been done intermittently by emptying and filling a suction well with pumps not working while the well is filling.

Such irregular pumping has required large suction wells and exposed parts of their walls for considerable periods resulting in nuisance from septic action of the accumulation of sewage resting in the suction well between pumping intervals and the refuse left on the walls when the well was pumped down or emptied.

By the use of my control system a much smaller and cheaper suction well is used and the sewage is pumped out as fast as it comes in, none of it remaining in the well long enough to become obnoxious. The accumulations on the walls are prevented and the objectional septic action in sewage pumping plants as heretofore constructed is avoided.

In the preferred forms of the invention, the pumping is effected continuously and the controller is designed to accomplish this result without intermittent operation involving the stopping of all motors for even very short periods. The rate of pumping is automatically selected to be as smooth and uniform as is consistent with the inflow, and changes in the rate of pumping are as small and infrequent as possible.

The master controller is preferably capable of being actuated by any one of two or more float devices, as by means of separate cables and counterweights, whereby at least one float device is insured to be always in working condition, and to allow repairs to be made to the remaining float devices, if necessary. Means are provided for manually shifting the master controller from any one float device to any other float device or to disconnect the master controller from all float devices and operate the master controller independently of the floats, at any time, while the controller is in operation. In such preferred forms, means are also provided for manually adjusting the float level at which the master controller performs its various functions, so that the level in the suction well, from which any given rate of flow of sewage will be pumped, may be set at the will of the operator, while the controller is in operation at the highest point consistent with the maximum flow of any definite time period, thereby reducing the power required for pumping to a minimum.

Means are also provided for manually changing the sequence of cutting in the various pump motors so that both constant and variable speed motors may be started in any order and their use proportioned so as to insure uniform wear of all motors and pumps of either kind and permit the use of either a constant or variable speed motor as the first to be cut in. The above and other desired interchangeable relations may be effected to suit the particular requirements of any specific plant.

Further objects and features of the invention will be more fully set forth in the following description and in the accompanying drawings in which—

Figure 1 is a front elevation of the panel of a master controller, with a portion of the well and float shown in central section;

Fig. 3 is a side elevation of Fig. 4, as viewed from the left;

Fig. 7 is a top plan view of the well section and float on the line 7—7 of Fig. 1;

Fig. 8 is a diagram of the master controller and electrical parts and connections to the motors actuating the pump or pumps; and Fig. 9 is a detail view of the controller switch arm taken at its normal position.

Figure 2:
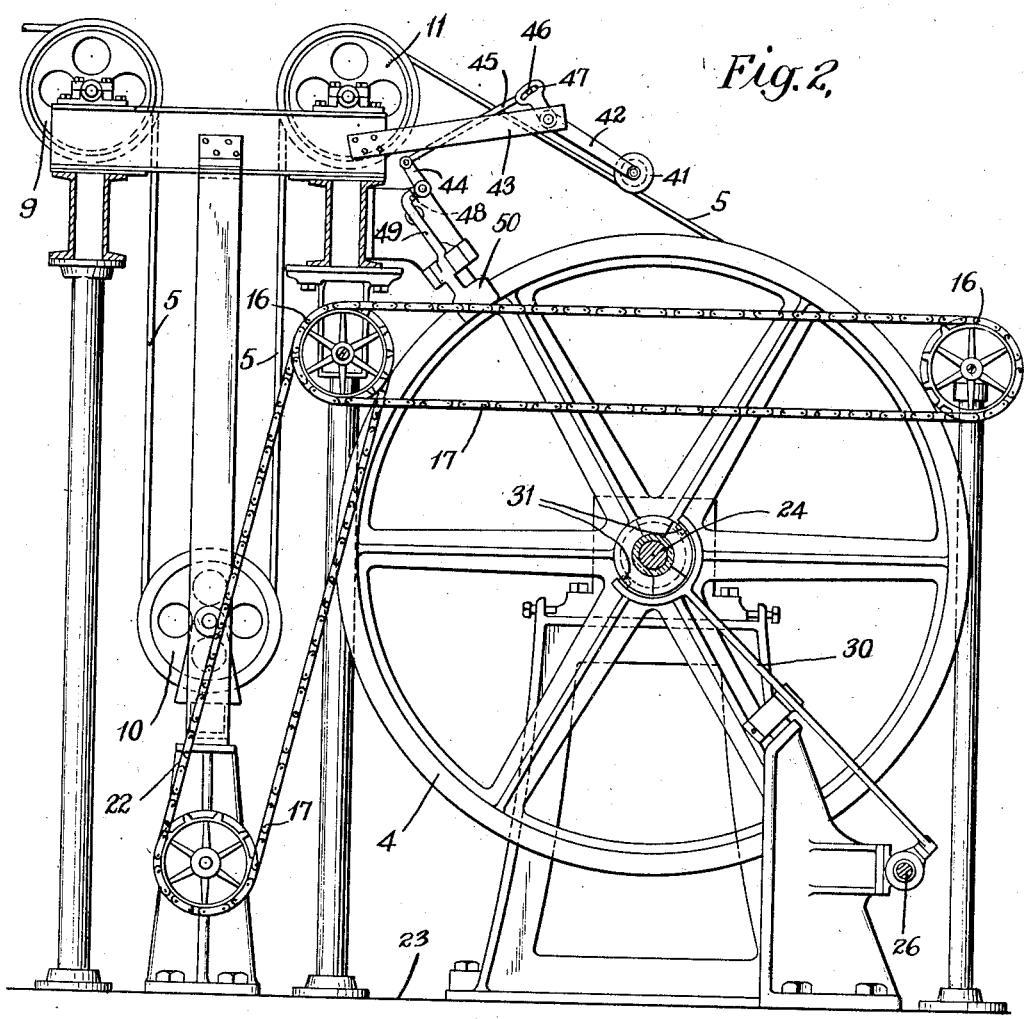
Fig. 2 is a sectional elevation on the line 2—2 of Fig. 4, showing a main sheave and certain auxiliary sheaves of the controller of Fig. 1, but on an enlarged scale.
Figure 6:
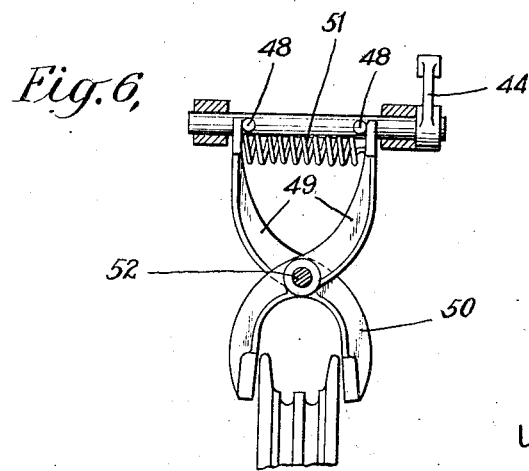
Fig. 6 is a detail top plan view of a brake for a main sheave.
Figure 4:
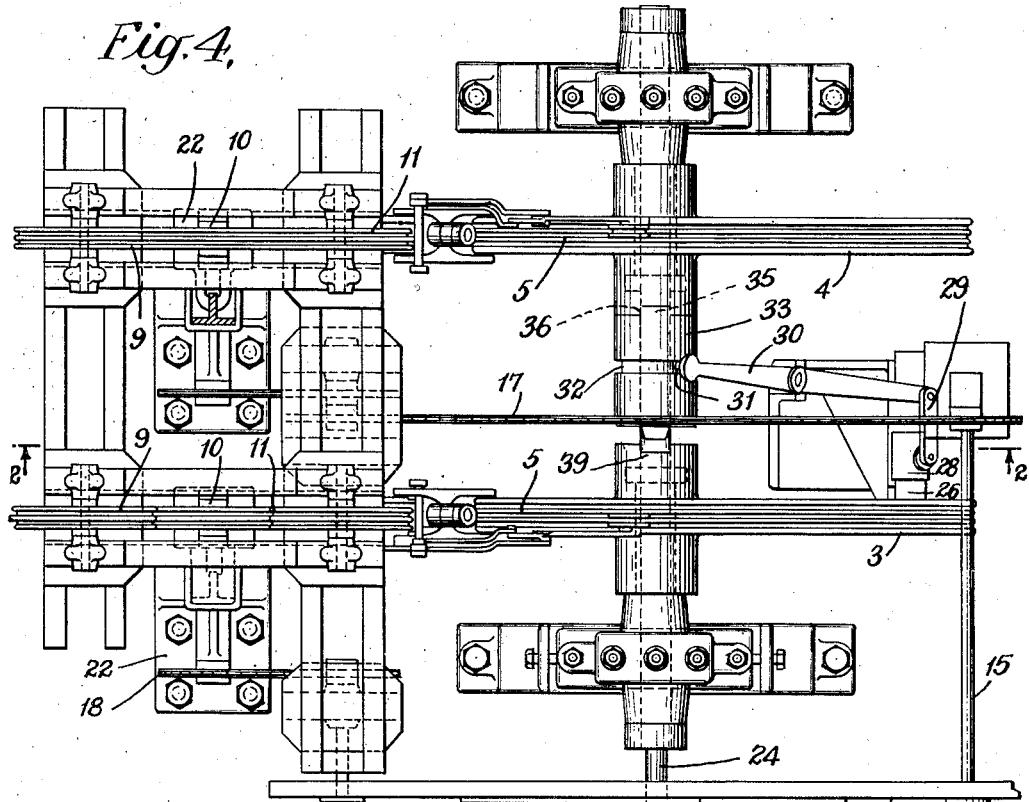
Fig. 4 is a top plan view of the main portion of Fig. 1, on an enlarged scale.
Figure 5:
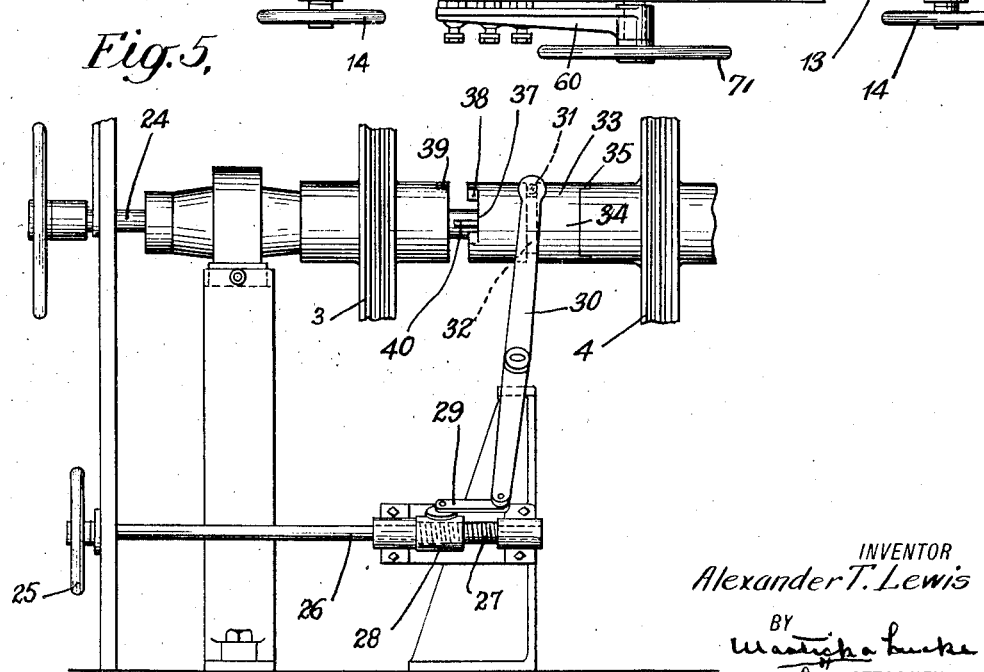
Fig. 5 is a detail side plan view of the means for coupling and uncoupling either main sheave.

Referring to Figs. 1 to 7, the master controller, as shown, comprises two floats 1 arranged in individual float tubes 2 and connected to the respective main sheaves 3, 4 by separate cables 5. The liquid level (see Fig. 1) represents the sewage level which fluctuates under conditions of inflow into the sewage tank or suction well and outflow therefrom determined by the discharge through the pump or pumps (not shown) effected by the particular motor system. The drawings represent a plant capable of pumping at the rate of ten million to sixty-five million gallons per twenty-four hours with a change in float level, without manual adjustment, not exceeding seven feet. Such float travel effects a total angular movement of the switch arm of the master controller of approximately 168 degrees, as will be explained more particularly hereinafter. In the aforesaid arrangement six pumps are individually operated by six motors, three of which are of the constant speed type, and the remaining three of the variable speed type. Any five of these motor-pump units are under direct influence of the master controller while the sixth is held as a spare for cleaning, repairs, etc. With one only running the minimum capacity is secured and with five running the maximum capacity.

The master controller is of the dial type and a general object of the invention, as concerns the automatic operation thereof, is to effect discharge of the sewage from the suction well as fast as the same flows in, preferably by the employment of a constant speed motor operating a pump to effect a minimum discharge rate, say ten million gallons per day; then, under conditions of greater inflow rate of the sewage, say up to twenty-five million gallons per day, a motor of variable speed is operated jointly with the aforesaid constant speed motor and its speed controlled in accordance with the changes in rate of inflow. Under still greater inflow of sewage, the controller sets into actuation other constant and variable speed motors until the total capacity of the motors set into operation is sufficient for the maximum requirement of the station. The motor arrangement in general provides for operating constant speed, high efficiency simple motor pump units as much as possible with variable speed, variable capacity motor pump units to fill the gaps in capacity between the fixed capacities of one or more constant speed units. Similarly, the arrangement provides for automatically connecting in the proper motor pump units of lower capacity or smaller number under conditions of reduced sewage inflow rate. If any motor or motor controller fails the master controller will automatically start the motor next in order in the operating cycle and continue as before. Provision is also made for fixing the time interval during which a predetermined maximum change in rate of operation of any variable speed motor may transpire.

In the specific construction as shown, duplicate floats are provided, each float 1 is of any approved hollow, air and water-tight construction, and further is provided with guide wheels 6 adapted to ride on the inner faces of the float tube 2. The spray pipes 7, supplied with clear water or sewage effluent, afford means for keeping clean the guide wheels 6 of floats 1 and the interior of the float tubes 2 and preclude septic action. The float tubes are constructed to allow the floats to be readily removed through the upper ends, and spiders 55 are positioned at the lower ends to prevent the floats from dropping out through the lower ends.

In each of the duplicate float arrangements, the cable 5 extends over the fixed sheaves 8, 9, thence under the adjustable sheave 10, thence over fixed sheave 11, thence around the respective main sheaves 3, 4, and finally to the counterweight 12. Each said adjustable sheave 10 is regulated manually from the front of the respective main switchboard 13 by means of the hand wheels 14, respectively fixed on the shafts 15, and the respective sprockets 16, also fixed to the respective shafts 15, and sprocket chains 17 connecting sprockets 18 with sprockets 16, said sprockets 18 controlling the bevel gears 19, meshing respectively with the bevel gears 20, loosely mounted on the screw threaded studs 21, to which said adjustable sheaves 10 are attached. Each said stud 21 is mounted in a frame 22, on which sprocket 18 and bevel gear 19 are supported. The aforesaid sheaves and frame 22 are shown positioned above the floor indicated by 23, and the floats 1 and float tubes 2 and counterweights 12 are arranged to operate below the level of floor 23.

Accordingly, upon clock-wise rotation of one hand wheel 14, a sheave 10 will be forced downwardly and thereby correspondingly decrease the effective length of the cable 5 between one of the main sheaves 3, 4 and its float 1, and accordingly effectively lower the float level at which the master controller performs its various functions when actuated by that float and sheave. Similarly, counter-clockwise rotation of hand wheel 14 effects a raising of the effective float level relative to the functions of the master controller. Such effective lowering or raising of the float level may be set at the will of the operator at any stage of operation of the controller, and permits manual adjustment of the float level at any time to secure minimum expenditure of power in correspondence to varying inflow conditions of the sewage.

Suitable means are provided for manually shifting from the starting panel either main sheave 3, 4 from actuating connection with main shaft 24 carrying the switch arm controlling the electrical circuits of the motor controllers. Such means comprises the hand wheel 25, fixed to shaft 26 having the threaded portion 27 and the internally threaded sleeve 28, which is pivotally connected through the link 29 and forked lever 30 by pins 31 and groove 32 to the coupling sleeve 33. The end 34 of sleeve 33 is provided with the projection 35 adapted to be received into the recess 36 of the hub of main sheave 4, when the hand wheel 25 is turned in counter-clockwise direction. Similarly, the end 37 of sleeve 33 is provided with the projection 38 adapted to be received into the recess 39 of the hub of main sheave 3, when the hand wheel 25 is turned in clockwise direction. The clearance between the inside faces of the hubs of the main sheaves 3, 4, having the recesses 36, 39, is such that when the hand wheel 25 is rotated to neutral or off position, the sleeve 33 is disconnected from both the main sheave wheel hubs, said sheaves 3, 4, are then free to rotate on the main shaft 24 without engaging the projections 35, 38, and the switch arm 60 can be turned manually by the hand wheel 71, regardless of the position or rotative movement of the sheaves 3, 4. The sleeve 33 is connected to the controller shaft 24 by the feather 40. Such coupling of either main sheave 3, 4 is accordingly effected only at the predetermined position with respect to the shaft 24, and correspondingly with respect to the contact arm of the controller, as will appear more fully hereinafter.

In the event of undue slack in cables 5, means are provided for automatically gripping either main sheave 3, 4, comprising the roller 41 idly riding on the cable 5, and carried by the lever 42, supported by arm 43. The lever 42 is connected to the rocker arm 44 through the link 45 and pin 46 and slot 47, the latter allowing a predetermined extent of lost motion. The rocker arm 44 is provided with pins 48 normally holding the arms 49 of gripper 50 in open position. Upon undue sag or slap of cable 5, the pin 46 will have engaged the end of slot 47, and forced rocker arm 44 downwardly (Fig. 2) thereby rotating pins 48 out of engagement with arms 49 and permit the spring 51 to close the gripper 50. The gripper 50 is shown supported at its pivot 52.

In a like manner, the braking device may be arranged between either main sheave and the respective counterweight, and to this end, an additional idle sheave may be interposed between the main sheave and the counterweight to give the desired inclination of the cable 5 as indicated in Fig. 2.

As stated in the foregoing, the specific form of my invention illustrated by the drawings embodies a dial master controller for the electrical circuits comprising a radially movable switch arm 60 carrying a set of four contacts 61, 62, 63, 64, connected in parallel to one another and a second set of two contacts 65, 66 also connected in parallel to each other. On the switch panel are arranged fixed contact segments of proper arcuate lengths disposed at corresponding radial distances.

As specifically shown in Fig. 9, contact 61 is connected by the conducting spring 67 with the contact 62, similarly, contact 63 is connected by the conducting spring 68 with the contact 64. The lead 69 connects the spring 67 with the spring 68, thereby connecting said four contacts 61, 62, 63, and 64 in multiple. In like manner, the contact 65 is connected with contact 66 by the metallic spring 70.

In the diagram, Fig. 8, the leads running to the motor starting and control panels of the constant speed motors, are arranged at the left, and the leads running to the motor starting and control panels of the variable speed motors are shown at the right. Preferably, alternating current motors are employed as the constant speed motors, thereby attaining high efficiency of power applied. The variable speed motors are shown as of the direct current type, but alternating current motors may be also employed. The three-point plugs $y^1$, $y^2$ and $y^3$ are normally in position within the respective three-point receptacles, $x^1$, $x^2$ and $x^3$, the plug $M^1$ of plug $y^1$ being within the socket $m^1$ of receptacle $x^1$; the plug $C^1$ being within the socket $c^1$ and the plug $B^1$ being within the socket $b^1$, and similarly for the remaining corresponding plugs and sockets of the aforesaid three-point receptacles. Said three-point plugs $y^1$, $y^2$, $y^3$ are usually attached to flexible cables to permit interchangeable connection with either of the other two receptacles, as $y^1$ with $x^2$, $y^2$ with $x^3$ and $y^3$ with $x^1$; $y^1$ with $x^3$, $y^2$ with $x^1$ and $y^3$ with $x^2$, etc. Such interchanging of connections enables any particular constant speed motor to be substituted in place of either of the other motors thereby interchanging the constant speed motors in all possible permutations in the order of the sequence effected by the master controller.

Similarly, the seven-point plugs $Y^1$, $Y^2$, $Y^3$ correspond to the seven-point receptacles $X^1$, $X^2$, $X^3$ and are arranged to provide for universal interchangeability between plug and receptacle with respect to the variable speed motors.

The leads M, C, B, P, I of the three respective sets of constant speed motor lines connect with the motor starters and control panels of the respective motors. Similarly, the leads W, N, S, O, G, A, D, E, L of the three respective variable speed motor lines connect with the motor starters and control panels of the respective motors. Such motor starters and control panels, together with suitable overload, underload and other protective devices are of approved construction, and will be fully understood without specific showing on the diagram.

The alternating current controller supply line for the constant speed motors, is indicated by P, M, and the direct current controller supply line is indicated by N, L. The two innermost arcs of segmental contacts are mostly related to the constant speed motor circuits, whereas the outer four arcs of contacts relate mostly to the variable speed motor circuits. Whereas the diagram of Fig. 8 apparently indicates blank spaces between contacts on the same arc, however in practice, as is understood, such blank spaces would be filled by corresponding blocks of insulation. For sake of clearness and brevity, contacts and their corresponding lines and connections are designated by similar reference characters.

Referring now to the switch arm and dial contacts let it be assumed that the switch arm 60 moves from the all-off position indicated in Fig. 8 in the direction of arrow 71', the direction of actuation of the switch arm upon rise of the actuating float. The first effective closure, assuming the double throw three-blade knife switch F to be closed at its lower position, is the closure between contacts $M^1$ and $C^1$, respectively connected with the aforesaid sockets $m^1$ and $c^1$, said closure causing the first constant speed motor to start by instantaneous contact through contact $C^1$, which motor continues to operate at its constant speed after the switch arm has passed the contact $C^1$. Continuing further movement of the switch arm in the aforesaid direction, the next effective closure is between contacts $S^1$ and L causing the first variable speed motor to be started by instantaneous contact through $S^1$, whereafter said variable speed motor continues to drive its pump unit in conjunction with the pump unit driven by said first constant speed motor. The closure between contacts $G^1$ and L incidental with said closure between contacts $S^1$ and L and the continued closure between contacts $G^1$ and L as the switch arm 60 continues movement in the aforesaid direction, causes said variable speed motor to operate at a slow speed as long as closure is made with the contact $G^1$.

Continuing the aforesaid movement of switch arm 60, the next effective closure is between contact $A^1$ and L causing variable speed motor to increase slowly in speed, said increase in speed being only while in engagement with contact $A^1$. By suitably proportioning the arcuate length of contact $A^1$, combined with adjustment of the speed of the mechanism (not shown) employed for controlling the motor speed, the increase in speed of the variable speed motor is held within predetermined limits for a given time interval and float movement.

Continuing the aforesaid movement of switch arm 60, the next effective closure is between contacts $C^2$ and $M^2$, causing the second constant speed motor to be started, upon instantaneous connection through $C^2$ and relay $C^2R$, whereupon said second constant speed motor drives at its constant speed, in conjunction with the previously started first constant speed motor.

It will be noted that the closure between contact R and contact L, or the excitation of relay $C^2R$, cuts out the accelerating control device controlled by contact $A^1$, such cutting out being effected by exciting relay $R^r$, breaking the lower contacts $r^1$ and $r^2$ and closing the upper contacts $r^3$ and $r^4$, thereby holding said $A^1$ circuit open until restored by excitation of relay $T^r$. The lead N is a common lead connecting the windings of relay $T^r$ and relay $R^r$ with socket N of the seven-point receptacles, thence through plugs N of the seven-point plugs to the supply line of the panel of the master controller. Simultaneous with the excitation of relay $C^2R$ and closing of starting circuit $C^2$ said relay also closes its armature contacts $d^1$, $d^2$, thereby closing the circuit through socket plug D, causing a sudden slowing down of the variable speed motor, which takes place simultaneous with starting up the second constant speed motor, as aforesaid.

The relay $C^2R$ serves as an interlock between the circuits connecting the winding of relay $R^r$ and controller lead C and the lead D running to the motor control panel.

Continuing further the aforesaid movement of switch arm 60, the next effective closure is between contact T and contact L, energizing relay $T^r$ to break the circuit through the exciting coil of relay $R^r$ and restore its armature to normal position, reclosing the contacts $r^1$ and $r^2$ and closing the $A^1$ accelerating circuit.

Continuing still further movement of switch arm 60, the next effective closure is between contacts L and $A^1$, causing said variable speed motor to be again increased slowly in speed, similar to the aforesaid previous speeding up of said variable speed motor within predetermined limits of increase per certain time interval or per certain distance of float travel.

Still continuing further movement of switch arm 60 in the aforesaid direction, the next effective closure is between contact $M^3$ and contact $C^3$, the latter requiring but instantaneous contact to start the third constant speed motor through its motor starter, such connection from contact $C^3$ being through relay $C^3R$ causing its armature contacts $f^1$ and $f^2$ to be closed to effect connection between sockets $c^3$ and $m^3$, plugs $C^3$ and $M^3$ and thus connection between the motor control leads C and M leading to the motor starter of said third constant speed motor.

At about the same time of starting said third constant speed motor, the closure between contacts R and L, or by excitation coil of relay $C^3R$, holds the $A^1$ circuit open, similarly as aforesaid, the excitation of relay $C^3R$ causing a sudden slowing down of the variable speed motor, simultaneous with the starting of said third constant speed motor.

The next effective closure is between contacts T and L, restoring the excitation of relay $T^r$, to break the circuit through relay $R^r$ and reclosing the $A^1$ accelerating circuit.

The next effective closure, upon further movement of switch arm 60, is between dial contacts $A^1$ and L causing said variable speed motor to be again slowly increased in speed under predetermined conditions, as heretofore, said variable speed motor being now operated in conjunction with the three constant speed motors. Still further movement of switch arm 60, effects closure between contact L (on the third arc) and contact $S^2$, substantially preceding the closure between contact L (on the first arc) and contact $A^2$, thus causing the second variable speed motor to be started by instantaneous contact, and the contact $A^2$ causing slow acceleration of the second variable speed motor under conditions similar to the conditions of acceleration effected by contact $A^1$ relative to the first variable speed motor. At the extreme position of the switch arm 60, all three constant speed motors are running at their normal constant speeds and the two variable speed motors are running at maximum speed conditions subject to predetermined limits, as described aforesaid.

In the event that the combined five motors do not suffice to yield the desired total power, i. e. total pumping discharge from the suction well, a third variable speed motor connected through seven-point receptacle $X^3$, and seven-point plug $Y^3$, may be operated in addition by closing the push button represented by the right hand series H of two contacts, thereby operating all six motors under combined manual and automatic control at the all-on position of the switch arm.

The third variable speed motor may be disconnected by closure of the push button as represented by the left hand series J of three contacts, causing the same to be slowed down or stopped.

Retracing in the direction counter to arrow 71', from the all-on position of switch arm 60 the closure between contacts $G^2$ and L (on the first arc) causes the second variable speed motor to be slowly decreased in speed, and continued retracing of the switch arm 60 to contact $O^2$ causes said variable speed motor to be stopped, thus leaving the first variable speed motor and the three constant speed motors in operation under automatic control of the master controller.

Further reverse movement of switch arm 60, effects closure between contact $G^1$ and contact L causing the first variable speed motor to decrease slowly in speed, the extent of decrease in speed being regulated similarly to the regulation of the increase in speed effected by contact $A^1$, as heretofore described.

Prior to the completion of engagement of the switch arm 60 with contact $G^1$ the closure between contact R and contact L cuts out the accelerating contact $A^1$ by means of the relay $R^r$, thereby permitting the switch arm 60 to continue its reverse movement to the contacts T and $B^3$ without speeding up said variable speed motor.

Upon further reverse movement of switch arm 60, closure is effected between contacts $B^3$ and $M^3$ causing said third constant speed motor to be stopped. Simultaneous with the closure of contacts $B^3$ and $M^3$, the closure between contacts T and L, or the excitation of relay $B^3R$ deënergizes the coil of relay $R^r$ and restores the $A^1$ accelerating circuit, thus insuring the acceleration or speeding up of the variable speed motor should the switch arm 60 reverse its direction, i. e. move in direction of arrow 71; following the stopping of said third constant speed motor and again engage contact $A^1$.

However if the switch arm 60 moves in its reverse direction i. e. counter to arrow 71, closure will next be effected between contact $G^1$ and contact L causing said variable speed motor to gradually decrease in speed, provided that the switch arm shall have previously engaged the contact $A^1$ in advance of said contact $G^1$; otherwise engagement with said contact $G^1$ is non-effective.

Upon continued reversed movement of switch arm 60, the next effective closure is between contact R and contact L whereby the $A^1$ circuit is again opened as hereinbefore described.

Continued reversed movement effects closure between contacts T and L again restoring circuit $A^1$ as hereinbefore described and simultaneously effecting closure between $B^2$ and $M^2$, whereupon the second constant speed motor is stopped.

Should the switch arm reverse its direction of movement at this point, i. e. move in the direction of arrow 71', it would again cause the speeding up of said variable speed motor, similar as hereinbefore described by closure with contact $A^1$.

Continuing further the reverse movement of switch arm 60 i. e. counter to arrow 71', the next effective closure is between contacts $G^1$ and L, causing slow decrease in speed of said variable speed motor similarly as heretofore. Under these conditions, the variable speed motor is operating under reducing speed simultaneous with the operation of the first constant speed motor.

Further continued reverse movement of switch arm 60, causes closure between contact $O^1$ and contact L causing said variable speed motor to stop.

Continued further reverse movement of switch arm 60 effects closure between contact $B^1$ and contact $M^1$ causing the first constant speed motor to stop, under which conditions the switch arm 60 is in its all-off position.

It will be noted that practically throughout the operative range of movement of the master controller provision is made for considerable angular movement of the switch arm incident to immaterial fluctuating movement of the float, without effecting any change in the motor control circuits, thereby precluding "hunting" of the motor control parts, as is common in control devices heretofore devised. However, upon greater angular movement of the switch arm incident to material changes in level of the float the master controller effects automatically the desired increase or decrease in pump capacity to meet the required demands. By thus avoiding changes in pumping rate incidental to fluctuations in the level in the suction well, the rate of flow into the settling tanks is maintained with a minimum number of changes, and consequently with minimum disturbance and the changes in rate of pumping are made responsive to substantial and relatively important changes in the rate of inflow of the sewage into the suction well.

It will be understood that the above effects in dial contact closures considered as taking place under conditions of continued movement of the switch arm in either direction, are similarly effected under conditions of oscillatory movements of the switch arm from any point to any other point within the operative range of movement of the switch arm.

The two-point push buttons 72 represented adjacent the three-point receptacles $x^1$, $x^2$, $x^3$ are for manually starting or stopping the respective constant speed motors, the left hand contact effecting stopping and the right hand contact starting. The lamps I of the constant speed circuits indicate the "running" or "stop" conditions of the respective motors.

The lamps W, which may be white, show "running" for the respective variable speed motors. The lamps D, which may be red, show "sudden slowing down" of the respective variable speed motors. The lamps A, which may be yellow, show "slow acceleration" for the predetermined time interval, for the respective variable speed motors. The lamps G, which may be green, show "slow decrease" in speed for the respective variable speed motors. The lamps E, which may be blue, show "normal speed" for the respective variable speed motors. These lamps are preferably positioned at the front of the panel of the master controller.

It will be observed that the switch F, when thrown into its upper position, substitutes the aforesaid third variable speed motor for the aforesaid first named constant speed motor, for the purposes hereinbefore set forth.

Thus, complete interchangeability of motors, constant speed or variable speed, or both, may be effected by the above described provision of means, to thereby provide simple means for manually changing the sequence of cutting in the various pumps in any desired order and thus proportion their use to insure uniform wear. Also, to permit use of either a variable or a constant speed motor as the first pump to be cut in. Also, for automatically changing the speed of the variable speed motors gradually, as by shunt field control or equivalent means, and for suddenly slowing down said variable speed motors during the starting of an incoming constant speed motor.

The above arrangement also provides for automatic and adjustable time limit control mechanism for the variable speed pump speed changing devices to prohibit too rapid change in speed of the variable speed pumps. Also, for manually starting and stopping all, or any, of the six pumps and for speeding up and slowing down each of the variable speed pumps independently of the master controller or floats. Also, for means for visual indications on the master controller panel of the operating conditions of all six pump motors at all times.

In case of failure of the master controller or during repairs, any and every one of the six pump motors may be started or stopped manually, and in the case of the variable speed motors, the speed varied, manually, at the starting panel of the switchboard belonging to each pump motor.

The above arrangement typifies a relatively large power plant with relatively high power and varied type of machines, embodying the feature of relatively wide range of duty. It will be understood that in smaller power plants or in plants of different range of duty, the number of motors and the number of types of motors may be reduced or modified, but the control of the same is effected in accordance with the principles of the invention.

I claim:

1. In a control system, the combination including a controller, a plurality of mechanisms for actuating said controller and means for disconnecting any one or more of said mechanisms at any time while said controller is in operation.

2. In a control system, the combination including a controller, a plurality of mechanisms for actuating said controller, means for disconnecting any one or more of said mechanisms while the said controller is in operation and means for continuing said operation manually.

3. In a control system, the combination including a controller, mechanism responsive to varying conditions actuating said controller, two or more variable speed machines, and means controlled by said controller for automatically starting, changing the speed of and stopping each variable speed machine separately.

4. In a control system, the combination including a master controller, a plurality of mechanisms for actuating said master controller, means for manually changing and adjusting the limits of changes within which any one or more of said mechanisms act while said master controller is in operation.

5. In a control system, the combination including a controller, mechanism for actuating said controller, machines controlled by said controller, means for automatically starting and stopping said machines serially in a predetermined sequence and means for automatically adjusting the speed or output of one or more of said machines independently of the others.

6. In a control system a plurality of motor driven machines, individual controllers for each of said machines capable of starting, stopping and varying the speed or output of their respective machines, a master controller actuated by mechanism responsive to varying conditions and means whereby said master controller actuates said individual controllers to start, stop and vary the speed or output of any one of said motor driven machines automatically in a predetermined sequence independently of the remaining motor driven machines.

7. In a control system, the combination including a controller, mechanism for actuating said controller including a tension member and means for varying the effective length of said tension member while under tension without interrupting the operation of said controller.

8. In a control system, the combination including a controller, two or more mechanisms for actuating said controller automatically, means for disconnecting and connecting each of said mechanisms and said controller in predetermined relative positions one at a time, and means for actuating said controller manually while disconnected from all of said mechanisms.

9. In a control system, the combination including a controller, one or more constant speed motor driven machines, one or more variable speed motor driven machines, said motors being controlled by said controller, a mechanism controlling said controller, said mechanism being subject for relatively long periods to variations within a predetermined range and for only relatively short periods to variations beyond said predetermined range, and means for operating one or more said constant speed motors during said relatively long periods and for operating one or more said variable speed motors during said short periods.

10. In a control system, the combination including a controller, a variable speed machine, a plurality of constant speed machines, said machines being controlled by said controller and means for automatically effecting the following sequence of operations, starting one of said constant speed machines, then starting said variable speed machine, then speeding up said variable speed machine, then slowing down said variable speed machine and simultaneously starting another of said constant speed machines, then again speeding up said variable speed machine, and so on until all said constant speed machines have been started in a predetermined cycle.

11. In a control system, the combination including a controller, mechanisms responsive to certain variable conditions actuating said controller, one or more constant speed motor driven machines, one or more variable speed motor driven machines, means controlled by said controller for automatically starting and stopping the motor of each of said constant speed machines and for starting, changing the speed of and stopping the motor of each of said variable speed machines.

12. In a control system, the combination including a controller, mechanism responsive to variable conditions actuating said controller, one or more constant speed motor driven machines, one or more variable speed motor driven machines, means controlled by said controller for automatically starting, operating and cutting out of operation each and all of said motors.

13. In a control system, the combination, including a controller, mechanism responsive to variable conditions actuating said controller, a variable speed machine, a plurality of constant speed machines, said machines being controlled by said controller, and means for automatically effecting the following sequence of operations, starting one of said constant speed machines, then said variable speed machine, then speeding up the variable speed machine, then slowing down the variable speed machine, and starting another of said constant speed machines, then again speeding up the variable speed machine and so on until all said constant speed machines have been started; and then slowing down said variable speed machine, then stopping a constant speed machine and simultaneously speeding up said variable speed machine, then slowing down said variable speed machine, and so on until all but one of said constant speed machines have been stopped and then stopping said variable speed machines and said last named constant speed machine.

14. In a control system, the combination of a controller, a plurality of mechanisms responsive to variable conditions capable of actuating said controller, means for manually connecting certain of said mechanisms with said controller in predetermined relative positions, means for actuating said controller manually while disconnected from any of said mechanisms, machines controlled by said controller and manually operative means for rendering said mechanisms ineffectual while rendering said manually actuated means effectual, and vice versa, without modifying the sequence of operations of said machines.

15. In a control system, the combination of a controller, a plurality of mechanisms for actuating said controller, means responsive to variable conditions for actuating said controller through said mechanisms, means for manually adjusting the connection between said mechanisms and said responsive means, means for manually connecting any of said mechanisms with said controller in predetermined relative positions, means for manually actuating said controller while disconnected from any of said mechanisms, a machine controlled by said controller and manually operative means for rendering said mechanisms ineffectual while rendering said manually actuated means effectual, and vice versa, without modifying the sequence of operations of said machine.

16. In a control system, the combination of a controller, mechanism actuating said controller and responsive to variable conditions, a plurality of constant speed and variable speed motors controlled by said controller, means for automatically starting and stopping said constant speed motors and automatically starting, changing the speeds of and stopping said variable speed motors in a predetermined sequence.

17. In a control system, the combination of a controller, mechanism actuating said controller and responsive to variable conditions, constant speed and variable speed motors, means for automatically starting motors, means for automatically starting and stopping said constant speed motors and automatically starting, changing the speeds of and stopping said variable speed motors in a predetermined sequence, and manually operable means for changing the order of said sequence while said control system is in operation.

18. In a control system, the combination of a controller, mechanism actuating said controller and responsive to variable conditions, constant speed and variable speed motors, means controlled by said controller for automatically starting and stopping said constant speed motors and automatically starting, changing the speeds of and stopping said variable speed motors in a predetermined sequence, and manually operable means for cutting out any motor or motors while said control system is in operation and manually controlling the operation of said cut-out motor or motors independently of the remaining said motors.

19. In a control system, the combination of a controller, mechanism actuating said controller and responsive to variable conditions, variable speed machines, and means controlled by said controller for automatically starting, changing the speeds of, and stopping any of said variable speed machines in a predetermined sequence.

20. The combination of a pressure responsive device, a yieldable member controlled by said pressure responsive device to move in a plurality of directions, actuating means, means for controlling said actuating means, said controlling means being controlled by said yieldable member in a plurality of directions, braking means including a movable element, means for holding said movable braking element in inoperative position for a predetermined range of yieldable movement of said yieldable member and means operative upon the yieldable movement of said yieldable member beyond said predetermined range for effecting the operation of said movable braking element.

21. In a control system, the combination with a controller, of a plurality of motors, means controlled by said controller for starting and stopping said motors in a predetermined sequence, manually operable means for modifying the order of said sequence of operation of said motors and visual means disposed adjacent to said controller for ascertaining the operating condition of any one or more of said motors.

22. In a control system, the combination including a controller, mechanism for actuating said controller, motor driven machines controlled by said controller so as to perform a series of operations in predetermined sequence and manually operable means for modifying the order of said sequence of operations of said machines.

23. In a control system, the combination of a controller, a constant speed motor, a variable speed motor having adjustable speed changing mechanism, and means controlled by said controller for automatically effecting a change in speed of said variable speed motor slowly under certain predetermined conditions and rapidly while said constant speed motor is either stopping or starting.

24. In a control system, the combination including a controller, motor driven machines controlled by said controller, mechanism responsive to variable conditions actuating said controller, and means controlled by said controller for causing said driven machines to perform a series of operations in a predetermined sequence when said controller is moving in one direction and a different series of operations in another predetermined sequence when said controller is moving in the reverse direction.

25. In a control system, the combination including a controller responsive to variable conditions, two or more constant speed machines, said controller controlling the stopping and starting of said machines, a variable speed machine, said controller controlling the stopping, starting and speed changes of said variable speed machine, means controlled by said controller for effecting the following sequence of operations, starting one of said constant speed machines, then starting and speeding up said variable speed machine, then simultaneously slowing down said variable speed machine and starting another constant speed machine, then again speeding up said variable speed machine, then slowing down said variable speed machine and starting up another of said constant speed machines, and repeating said operation until all of said constant speed machines have been started; then reversing the action of said controller and effecting a change in sequence of operation thereby slowing down said variable speed machine, then stopping a constant speed machine and speeding up said variable speed machine simultaneously, then slowing down the said variable speed machine and repeating said second named sequence of operations until all constant speed machines and said variable speed machine have been stopped, or for changing from one to the other of said sequences at any point in either of said sequences of operations.

26. In a control system, the combination including a controller, mechanism responsive to varying conditions for actuating said controller, a plurality of motors controlled by said controller, one of said motors being of the variable speed type, mechanism controlled by said controller for starting and stopping certain of said motors and for varying the speed of said variable speed motor at different rates of change, means for automatically starting said motors in a predetermined cycle, means for effecting a rapid change of speed of said variable speed motor and means for effecting a slow change of speed of said variable speed motor.

27. In a fluid pumping plant the combination of a controller, mechanism responsive to variable conditions actuating said controller, two or more variable speed pumps, mechanism controlled by said controller for starting, changing the speed of, and stopping each of said pumps, and means for automatically starting one of said pumps, then speeding it up, then slowing it down and simultaneously starting another pump, then speeding up one of said pumps, then slowing it down and starting another and so on until all are started, then speeding all up serially and means for automatically reversing the order of changes at any stage of said operation to slow down one pump, then stop another pump and simultaneously speed up said one pump and so on until all pumps are stopped, or the cycle is reversed.

28. In a control system, the combination including a controller, mechanism responsive to variable conditions actuating said controller, two or more variable speed motor driven machines and means controlled by said controller for automatically starting, varying the speed and cutting out of operation said motors.

29. In a pumping station, the combination of a suction well, a vertical tube having an open bottom connecting with said suction well, a float in said tube, a spider in the bottom of said tube to check the movement of said float, a spray pipe at the top of said tube for introducing a fluid into said tube, a controller actuated by said float, cable connecting said float with said controller, means for changing the effective length of said cable while said controller is in operation, means actuated upon failure of said cable or said float for stopping said controller, motor driven pumps controlled by said controller, means for automatically starting, stopping and operating said motor driven pumps in a predetermined cycle, manually operative means for changing the sequence of said pumps in said cycle and manually operative means for operating said controller or said pumps individually at any point in said cycle.

30. In a control system, the combination including a controller, mechanism responsive to variable conditions actuating said controller, one or more constant speed motor driven machines, one or more variable speed motor driven machines, means controlled by said controller for automatically starting, operating and cutting out of operation each and all of said motors and means for visually indicating which of said motors is operating and whether the said variable speed motors are slowing down, speeding up, running or at rest.

31. In a control system, the combination including a controller, mechanism responsive to certain variable conditions actuating said controller, two or more variable speed motor driven machines and means controlled by said controller for starting, changing the speed of and stopping the motor of any one or more of said variable machines independently of the remainder.

32. In a control system, the combination including a controller, mechanism responsive to variable conditions actuating said controller, two or more machines and means controlled by said controller for starting and stopping said machines, said controller comprising means whereby a movable element of said controller moves back and forth over a predetermined range, stops each machine at a point on said range posterior of its starting point and starts each machine at a point on said range anterior of its stopping point.

33. In a control system, the combination including a controller, mechanism responsive to variable conditions actuating said controller, two or more variable speed machines and means controlled by said controller for starting, stopping and varying the speed of each of said machines individually, said controller comprising means whereby a movable element of said controller moves back and forth over a predetermined range to effect the stopping of one or more of said machines at a point within said range posterior of its starting point, and effects a decrease in speed of said machine at a point posterior of its speeding up point within said range and effects the starting of said machine at a point within said range anterior of its stopping point.

34. In a control system, the combination of a controller, mechanism responsive to variable conditions for actuating said controller, means for manually connecting said mechanism with said controller in a predetermined relative position, means for actuating said controller manually while disconnected from said mechanism, machines controlled by said controller and manually operative means for rendering said mechanism ineffectual while rendering said manually actuating means effectual, and vice versa, without modifying the sequence of operations of said machines.

35. In a control system, the combination of a controller, mechanism for actuating said controller, means responsive to variable conditions for actuating said controller through said mechanism, means for manually adjusting the connection between said mechanism and said responsive means, means for manually connecting said mechanism with said controller in predetermined relative position, means for manually actuating said controller while disconnected from said mechanism, a machine controlled by said controller and manually operative means for rendering said mechanism ineffectual while rendering said manually actuated means effectual, and vice versa, without modifying the sequence of operations of said machines.

36. In a control system, the combination including a controller, mechanism responsive to variable conditions actuating said controller, a plurality of motor driven machines, means controlled by said controller for starting, operating and stopping any one or more of said machines independently of the remainder and means for visually indicating which of said machines is operating and the operating condition of said machines.

37. In a control system, the combination including a controller, mechanism responsive to variable conditions actuating said controller, a plurality of variable speed machines, means controlled by said controller for automatically starting, changing the speed of and stopping any of said machines independently of the remainder and means for visually indicating which of said machines is in operation and the operating condition of said machines.

38. In a control system, the combination including a plurality of motors, and a controller for automatically starting each of said motors separately, said controller comprising means operative upon movement of the movable part of the controller over a predetermined range for effecting the stopping of one of said motors at a point within said range posterior of its starting point and effecting the starting of said motor at a point within said range anterior of its stopping point.

39. In a control system, the combination of a controller, a plurality of motors, one of which is a variable speed motor, and means controlled by said controller for automatically effecting a change in speed of said variable speed motor slowly under certain predetermined conditions and rapidly under certain other conditions.

40. In a control system, the combination of a controller, a plurality of variable speed motors, means controlled by said controller for automatically effecting a change in speed of one of said variable speed motors slowly under certain predetermined conditions and rapidly under certain other conditions.

41. In a control system, the combination of a controller, a plurality of motors, one of said motors having speed changing mechanism, and means controlled by said controller for automatically effecting a change in speed of said variable speed motor slowly under certain predetermined conditions and rapidly while said other motor or motors are either stopping or starting.

42. In a control system, the combination of a controller, a plurality of motors, one of said motors having speed changing mechanism, and means controlled by said controller for automatically effecting a change in speed of said variable speed motor slowly under certain predetermined conditions and rapidly while said other motor or motors are in operation.

43. In a control system, the combination including a controller mechanism responsive to variable conditions actuating said controller, one or more constant speed motor driven machines, one or more variable speed motor driven machines, means controlled by said controller for automatically starting, operating and cutting out of operation each and all of said motors, manually operable means for substituting a variable speed motor driven machine, or vice versa, or for disconnecting any one or more of either said constant speed motor driven machines or said variable speed motor driven machines and means for visually indicating which of said motors are operating and the operating conditions of said constant and variable speed motors.

44. In a control system, the combination including a controller, mechanism responsive to variable conditions actuating said controller, one or more constant speed motor driven machines, one or more variable speed motor driven machines, means controlled by said controller for automatically starting, operating and cutting out of operation each and all of said motors, manually operable means for substituting a variable speed motor driven machine for any constant speed machine or vice versa, and means for visually indicating which of said motors are operating and whether said variable speed motors are slowing down, speeding up, running or at rest.

45. In a control system, the combination including a controller, mechanism responsive to variable conditions actuating said controller, a plurality of constant speed machines, a variable speed machine and means for automatically effecting the following sequence of operations: starting one of said constant speed machines then starting said variable speed machine, then speeding up said variable speed machine, then slowing down said variable speed machine and simultaneously starting another of said constant speed machines, then again speeding up said variable speed machine and so on until said constant speed machines have been started in a predetermined cycle.

46. In a control system, the combination including a controller, mechanisms responsive to variable conditions actuating said controller, a plurality of motors, means controlled by said controller for automatically starting, operating and cutting out of operation each and all of said motors and means for visually indicating which of said motors are operating and the operating condition of such operated motors.

47. In a control system, the combination of a controller, mechanisms responsive to variable conditions actuating said controller, a plurality of motors, means controlled by said controller for automatically starting, changing the speed of and stopping any of said motors independently of the remainder, manually operable means for varying the sequence of operation of said motors and means for visually indicating which of said motors are in operation and the operating condition of such operating motors.

48. In a control system, the combination of a controller, mechanisms responsive to variable conditions actuating said controller, a plurality of motors including variable speed motors, means controlled by said controller for automatically starting, changing the speed of and stopping said motors, and means for visually indicating which of said motors are in operation and the operating condition of such operating motors.

49. In a control system, the combination of a controller, mechanisms responsive to variable conditions actuating said controller, a plurality of motors including variable speed motors, means controlled by said controller for automatically starting, changing the speed of and stopping said motors, manually operable means for varying the sequence of operation of said motors, and means for visually indicating which of said motors are in operation and the operating condition of such operating motors.

50. In a control system, the combination including a controller, mechanism for actuating said controller by a torsion member and manual means for varying the effective length of said torsion member while under torsion without interrupting the operation of said controller.

51. In a control system, the combination including a controller, a plurality of motors, said motors being controlled by said controller, a mechanism controlling said controller, said mechanism being subject to variations exceeding a predetermined range for relatively short periods and means for effecting a substantially constant output of said motors during such relatively short periods.

52. In a control system, the combination including a controller, mechanism responsive to varying conditions actuating said controller, a plurality of variable speed machines and means controlled by said controller for automatically starting, changing the speed of and stopping each variable speed machine separately, said automatic means including means for precluding any variation in the operation of any operated variable speed machine or machines under conditions of variation within a predetermined range of said mechanism.

53. In a control system, the combination including a controller, mechanism responsive to varying conditions actuating said controller, a plurality of variable speed machines and means controlled by said controller for automatically starting, changing the speed of and stopping said variable speed machines separately, said automatic means including means for precluding any variations in the operation of any operated variable speed machine or machines under conditions of variations within certain predetermined ranges at determined stages of operation of said mechanism.

54. In a control system, the combination including a controller, mechanism responsive to varying conditions actuating said controller, a plurality of variable speed machines, means controlled by said controller for automatically starting, changing the speed of and stopping said variable speed machine separately, and means for visually indicating which of said motors is operating and whether said motors are slowing down, speeding up, running or at rest.

55. In a control system, the combination including a controller, mechanism responsive to variable conditions actuating said controller, a plurality of motor driven machines, means controlled by said controller for automatically starting and cutting out of operation each said machines separately and means for visually indicating which of said motors is operating and the operating condition of such operating machine.

56. In a control system, the combination of a plurality of motor driven machines, a controller, mechanism responsive to variable conditions actuating said controller, said controller including means for automatically effecting a series of operations in a predetermined sequence, and means for modifying the order of said sequence of operations.

57. In a control system, the combination including a controller, motor driven machines controlled by said controller, mechanism responsive to variable conditions actuating said controller, means controlled by said controller for causing said driven machines to perform a series of operations in a predetermined sequence when said controller is moving in one direction and a differently related series of operations when said controller is moving in another direction.

58. In a control system, the combination of a controller, mechanism for actuating said controller, a plurality of machines controlled by said controller, means for automatically starting and stopping said machines serially in a predetermined sequence and means for automatically adjusting the speed or output of one or more of said machines independently of the others.

In testimony whereof I have signed this specification.

ALEXANDER T. LEWIS.